United States Patent [19]

Nesheiwat

[11] Patent Number: 5,045,628

[45] Date of Patent: Sep. 3, 1991

[54] PRODUCTION AND RECOVERY OF POLY(ARYLENE SULFIDE KETONE) AND POLY(ARYLENE SULFIDE DIKETONE) RESINS

[75] Inventor: Afif M. Nesheiwat, Madison, N.J.

[73] Assignee: Phillips Petroleum Company, Bartlesville, Okla.

[21] Appl. No.: 459,036

[22] Filed: Dec. 29, 1989

[51] Int. Cl.$^5$ .................. C08G 75/14; C08G 2/00
[52] U.S. Cl. .................... 528/388; 525/471; 525/537; 528/226; 528/488
[58] Field of Search .......... 528/226, 388, 488; 525/471, 537

[56] References Cited

U.S. PATENT DOCUMENTS

| | | | |
|---|---|---|---|
| 3,549,595 | 12/1970 | Campbell | 260/49 |
| 3,565,862 | 2/1971 | Campbell et al. | 260/49 |
| 4,232,142 | 11/1980 | Barr et al. | 528/125 |
| 4,361,693 | 11/1982 | Jansons | 528/86 |
| 4,415,729 | 11/1983 | Scoggins et al. | 528/388 |
| 4,730,034 | 3/1988 | Nesheiwat et al. | 528/388 |
| 4,748,231 | 5/1988 | Nesheiwat | 528/486 |
| 4,877,850 | 10/1989 | Geibel et al. | 525/471 |
| 4,892,929 | 1/1990 | Geibel et al. | 528/480 |
| 4,892,930 | 1/1990 | Liang | 528/487 |
| 4,963,651 | 10/1990 | Nesheiwat | 528/483 |

FOREIGN PATENT DOCUMENTS 0156131  10/1985  European Pat. Off. .

Primary Examiner—Harold D. Anderson
Assistant Examiner—T. Mosley
Attorney, Agent, or Firm—Beverly M. Dollar

[57] ABSTRACT

A process is provided for preparing more granular (i.e., higher bulk density) particulate poly(arylene sulfide ketone) or poly(arylene sulfide diketone) resins having associated therewith improved processability and thermal stability, without generating pressures significantly greater than those generated during polymerization reactions of particulate poly(arylene sulfide ketone) or poly(arylene sulfide diketone) resins.

30 Claims, 1 Drawing Sheet

5,045,628

PRODUCTION AND RECOVERY OF POLY(ARYLENE SULFIDE KETONE) AND POLY(ARYLENE SULFIDE DIKETONE) RESINS

FIELD OF THE INVENTION

This invention relates to processes for the production and recovery of poly(arylene sulfide ketone)s or poly(arylene sulfide diketone)s.

BACKGROUND OF THE INVENTION

Poly(arylene sulfide ketone), henceforth abbreviated as PASK, and poly(arylene sulfide diketone), henceforth abbreviated as PASDK, resins are engineering thermoplastics of potential commercial interest for film, fiber, molding, and/or composite applications because of their outstanding thermal and mechanical properties. General processes for the production of PASK and PASDK are known in the art. For example, PASK and PASDK can be prepared by the reaction of an alkali metal sulfide in a polar organic compound with a polyhaloaromatic ketone or a polyhaloaromatic diketone, respectively.

Disadvantages often associated with the production of PASK and PASDK resins pertain to the processability and the thermal stability of the polymers produced. Specifically, at the completion of a typical polymerization reaction, the reaction mixture is generally in the form of a slurry comprising a liquid phase (predominantly a polar organic compound and water) and a particulate phase (predominantly polymeric resin), wherein the polymeric resin contained in the particulate phase is in the form of powder-like particles when recovered. These powder-like polymeric particles have very low bulk densities when recovered (e.g., generally less than 10 lbs/ft$^3$). The slurry containing this extremely fine powder-like resin filters very slowly and, thus, hampers the polymer's washability, recoverability and processability. Washing, recovering and/or processing PASK and PASDK resins which have low bulk densities are extremely difficult.

Other problems which are inherent with low bulk density resins pertain to commercial plant operations, such as production and storage capacities and/or environmental concerns. Specifically, since production and storage vessels in a commercial plant have a constant volume associated therewith, as the bulk density of a polymeric resin decreases, so does the production and storage capacity of the commercial plant. Therefore, if the bulk density of a polymeric resin can be increased, the production and storage capacities of the commercial plant would also increase.

As for environmental concerns, a low bulk density resin which is in the form of a powder would have a greater tendency of being dispersed through the air of the working environment during downstream processing and handling procedures than would a similar polymeric resin having a higher bulk density. Therefore, providing a polymeric resin having an increased bulk density would improve the environmental conditions which are associated with the handling and processing of such a resin.

Although in some commercial applications it is desirable to have the PASK or PASDK resin in the form a fine powder, in many other commercial applications, having a PASK or PASDK resin which has associated therewith higher bulk densities would be commercially desirable for the reasons stated above.

As stated earlier, another disadvantage associated with the preparation of PASK and PASDK resins pertains to the resins' thermal stability. Specifically, PASK and PASDK resins generally have relatively low thermal stabilities. When either PASK or PASDK resins are prepared and recovered by conventional methods, the resins contain certain volatile by-product materials. Since many polymer processing procedures (e.g., melt-forming, extrusion and blow-molding) require that the resin be heated to a temperature above its melting point, and since both PASK and PASDK resins have melting points above about 315° C. (600° F.), the subsequent melt-processing of PASK and PASDK resins can result in these volatiles vaporizing and/or boiling through the polymeric resin, often leaving voids therethrough. This vaporization of volatile materials is commonly known in the polymer industry as "degassing" and/or "outgassing". One detrimental effect of this degassing phenomena can be that of decreasing the melt stability of the PASK and PASDK resins. Since high melt stability is a necessary characteristic of resins which are to be melt processed, a low melt stability makes melt-processing procedures very difficult.

Melt-processing PASK or PASDK resins in a manner which results in a substantially void-free product has many inherent commercial applications. Therefore, it would be most desirable to produce melt stable PASK and PASDK resins of good polymer quality.

The internal pressures in polymerization process vessels during typical polymerization reactions are generally high (e.g., above about 150 psig). Safety risks and economic concerns are often associated with excessively high polymerization reactor pressures. For instance, as the internal pressure of a polymerization process vessel increases, the risk of potential safety hazards increases, as does the cost of designing and/or fabricating this process vessel.

When designing, purchasing and/or fabricating polymerization process vessels, one does so with the understanding that the polymerization process for which it will be employed will generate pressures falling with a specific range. Therefore, although a process to provide higher bulk density PASK or PASDK resins which have associated therewith improved thermal stability and improved processability is desirable, the desirability of such a process may decrease if it results in generating pressures within a polymerization process vessel which were in excess of the vessel's operable range.

STATEMENT OF THE INVENTION

One object of this invention is to provide novel PASK and PASDK resins which have associated therewith increased bulk densities and improved processability.

Another object of this invention is to provide a method for preparing and recovering melt stable PASK or PASDK resins.

Another object of this invention is to provide a process to prepare high bulk density PASK or PASDK resins, having associated therewith improved processability, without generating pressures which are significantly greater than those generated during typical polymerization reactions of PASK or PASDK resins.

In accordance with this invention, novel PASK or PASDK resins are provided by a process comprising the steps of: (a) preparing in an enclosed vessel a first slurry heated to a temperature of at least about 100° C. (212° F.), wherein the solid component thereof comprises a first particulate resin selected from the group consisting of PASK and PASDK, and wherein the liquid component thereof comprises a polar organic compound and water; (b) venting vapors from the enclosed vessel containing the heated first slurry, thereby removing at least a portion of the water therefrom; (c) substantially liquifying the first particulate resin contained in the heated first slurry to form a first mixture which comprises the substantially liquified resin and the polar organic compound; (d) adding to the first mixture a sufficient amount of at least one separation agent to produce a second mixture; and (e) reducing the temperature of the second mixture sufficiently to solidify the substantially liquified resin contained therein and form a second slurry, wherein the liquid component thereof comprises a mixture of the polar organic compound and the separation agent, and wherein the solid component thereof comprises a second particulate resin (i.e., the thus substantially liquified and solidified first particulate resin). In step (d) of the above process, the amount of separation agent added to the first mixture should be sufficient to result in the second particulate resin having a bulk density greater than about 10 lbs/ft$^3$.

In another embodiment of this invention, a PASK or PASDK resin produced by the above-described process is treated at an elevated temperature with a caustic solution. In yet another embodiment, a PASK or PASDK resin produced by the above-described process is treated at an elevated temperature with water soluble calcium ions.

The bulk density of the second particulate resin is greater than its respective first particulate resin. The processability of the second particulate resin is superior to that of its respective first particulate resin. The pressures generated by practicing this invention are not significantly greater than those generated during the polymerization process of the respective first particulate resin.

DETAILED DESCRIPTION OF THE INVENTION

Figure 1:
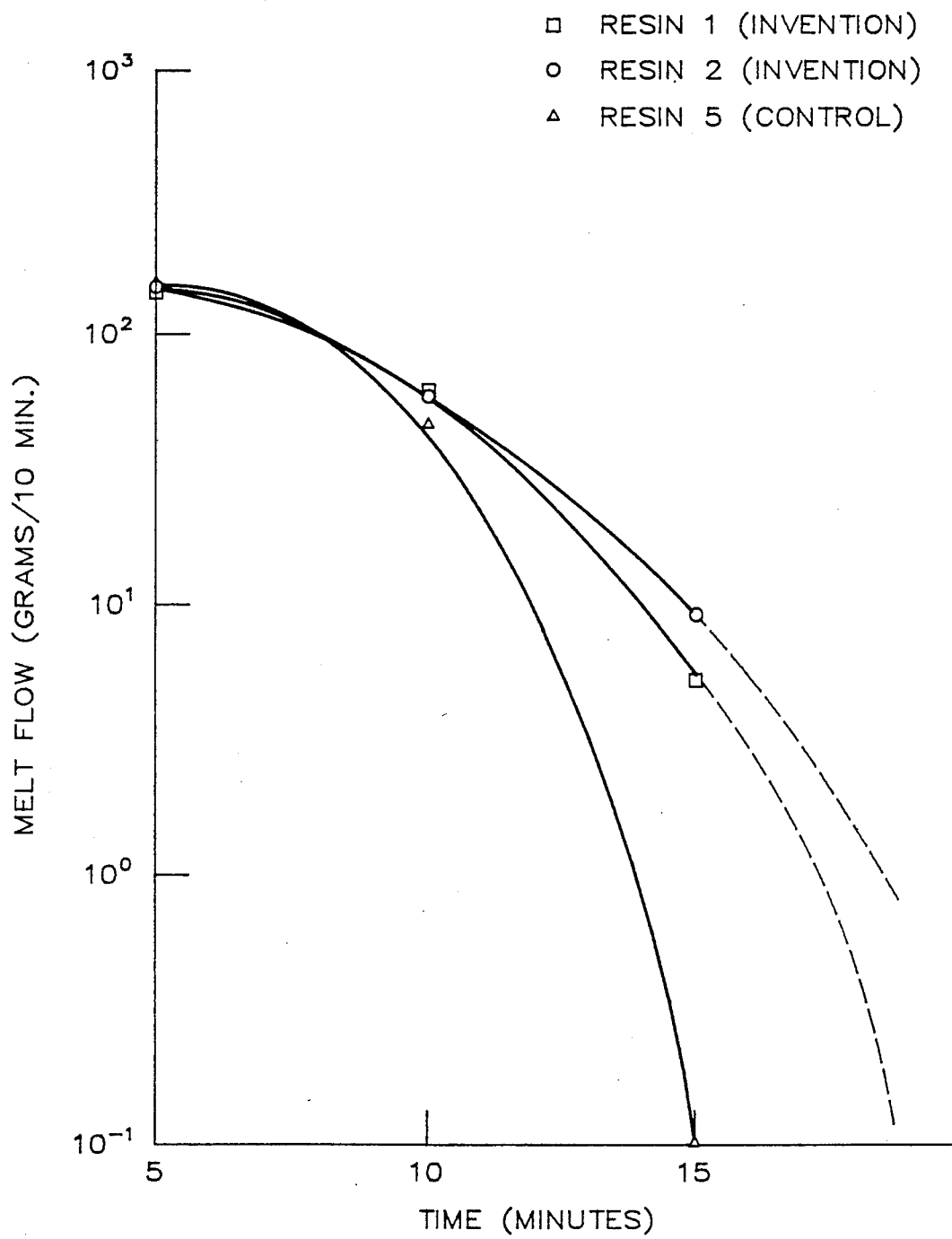
FIG. 1 is a graphic representation depicting the melt flow changes of two resins recovered according to this invention as compared to a resin recovered by conventional means.

As used herein, the term "bulk density" refers to the density of a dried granular polymeric resin. A resin's bulk density is determined by completely filling a container, having a known weight and volume, to its brim with a dried sample of the polymer to be tested. The bulk density of the specific polymer is then calculated after measuring the weight of the polymer in pounds (lbs) as a function of the volume of the container in cubic feet (ft$^3$). For the purposes of this invention, PASK or PASDK resins having bulk densities of at least 10 lbs/ft$^3$ are deemed to overcome many of the aforementioned problems often associated with resins having bulk densities less than about 10 lbs/ft$^3$.

Bulk densities of dried granular polymeric resins can be determined in terms of "loose" bulk density and/or "compacted" bulk density. The loose bulk density of a polymeric resin is determined by measuring the weight of the polymer as it naturally fills the test container to its brim. On the other hand, the compacted bulk density of a polymeric resin is determined by physically compacting the polymer in the test container until the compacted polymer reaches the brim thereof prior to weighing the amount of polymer contained therein. When the term "bulk density" is used herein, it refers to the resin's loose bulk density.

As used herein, the terms "melt flow" and/or "flow rate" are used interchangeably and refer to the rate at which a melted PASK or PASDK resin flows through an orifice which has a specific diameter and length when subjected to a specific downward pressure. Melt flow values are recorded in units of grams of extrudate which have flowed through the orifice over a ten minute interval (g/10 min) and are determined by a modified version of ASTM D1238, Procedure B. The modification employed herein is that the initial preheating time is 5 minutes, as opposed to the minimum 6 minute period specified by ASTM D1238, Procedure B and the "Condition" is X/5.0, wherein X is a temperature dependent upon the particular resin being tested. For example, for poly(phenylene sulfide ketone), X is 371° C.

As used herein, the terms "thermal stability" and/or "melt stability" are interchangeable and refer to the degree in which the melt flow values of a specific resin sample change while the resin is held at a temperature at or slightly above its melting point for different periods of time. As the thermal stability of a given resin improves, the degree in which the resin's melt flow value changes over given time intervals decreases. Generally, a resin's thermal stability is determined by measuring a resin's melt flow value, in accordance with the modified procedure described above, after the resin is retained in the barrel of the melt flow index apparatus of ASTM D1238 over 5 minute intervals. If the degree of change between the melt flow values of a specific resin sample taken at two consecutive 5 minute intervals decreases, the thermal stability of the resin is deemed to be improved. Generally, if the melt flow values between two consecutive 5 minute intervals change by less than ±60%, the resin is said to be thermally stable.

The polymers employed in this invention are those having the repeating unit:

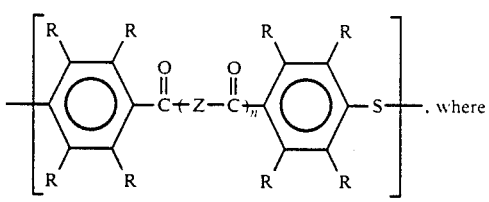

, where n = 0 or 1, Z = divalent radical selected from

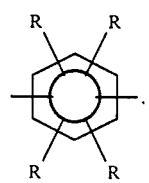

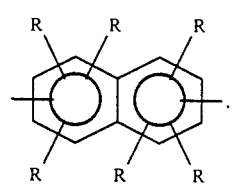

-continued

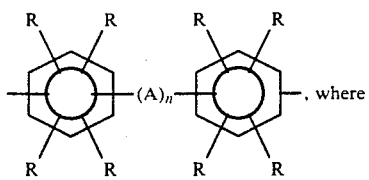

$m = 0$ or $1$, A selected from O, S, $\overset{\overset{O}{\|}}{C}$, $SO_2$, $CR_2$, $R = H$ or an alkyl radical having 1-4 carbon atoms.

Although other polymeric resins are not excluded, in general, the presently preferred PASK resins produced and/or recovered by the inventive process disclosed herein are poly(phenylene sulfide ketone) (PPSK) resins having as the repeating unit:

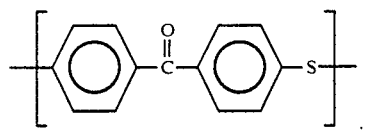

In general, the presently preferred PASDK resins produced and/or recovered by the inventive process herein are poly(phenylene sulfide diketone (PPSDK) resins having as the repeating unit:

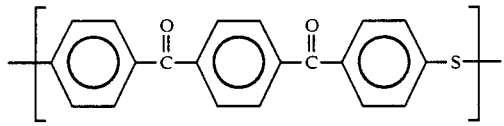

As stated earlier, this invention is a process to provide more granular (i.e., higher bulk density) second particulate PASK or PASDK resins having associated therewith improved thermal stability and improved processability without generating pressures significantly greater than those generated during polymerization reactions of the respective PASK or PASDK resins.

Since this invention can be practiced at any time after a first particulate PASK or PASDK is polymerized, it can be viewed as either (1) an effective means for providing a high bulk density resin having associated therewith improved thermal stability and improved processability, or (2) a means for increasing the bulk density of a previously prepared PASK or PASDK resin while simultaneously improving the respective resin's thermal stability and processability.

When practicing this invention, a heated first slurry is prepared in an enclosed vessel, wherein the solid component thereof comprises a first particulate resin selected from the group consisting of PASK and PASDK, and wherein the liquid component thereof comprises a polar organic compound and water. Any suitable method can be employed to prepare the first slurry of this invention. An example of a suitable method which will produce such a heated first slurry is one wherein a polyhalo-substituted aromatic ketone or diketone is contacted under suitable polymerization conditions with reactants comprising: (a) a sulfur source, (b) a polar organic compound, and (c) water. Under these conditions, a heated first slurry results wherein the solid component thereof comprises a first particulate PASK or PASDK resin having a bulk density generally less than about 10 lbs/ft³ (when recovered and dried), and wherein the liquid component thereof comprises a mixture of a polar organic compound and water. The temperature of this heated first slurry is at least about 100° C. (212° F.), preferably at least about 200° C. (392° F.).

Another example of a suitable method which results in such a heated first slurry comprises taking a PASK or PASDK resin which has already been prepared, recovered, and optionally dried and adding this resin to a liquid mixture comprising a polar organic compound and water. The resulting slurry is then heated in an enclosed vessel to a temperature of at least about 100° C. (212° F.), preferably at least about 200° C. (392° F.).

Suitable polar organic compounds which can be employed when practicing this invention are those which remain substantially in a liquid phase at the temperatures and pressures used for substantially liquifying the first particulate resin and which can also function as at least a partial solvent for the first particulate resin. Generally, organic amides are employed as the polar organic compound. Suitable organic amides can be cyclic or acyclic and can have from about 1 to about 10 carbon atoms per molecule. Examples of suitable organic amides include, but are not limited to, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone (NMP), N,N'-ethylenedi-2-pyrrolidone, hexamethylphosphoramide, tetramethylurea, 1,3-dimethyl-2-imidazolidinone and mixtures thereof. NMP is the presently preferred organic amide.

In the first slurry, the molar ratio of the moles of polar organic compound per moles of divalent sulfur present in the first particulate resin is generally determined by mechanical and/or economic limitations. When the first slurry is that resulting from a polymerization reaction, the molar ratio of the moles of polar organic compound to the moles of divalent sulfur employed as a reactant generally ranges from about 3:1 to about 25:1; more preferably, from about 6:1 to about 20:1; and even more preferably, from about 8:1 to about 16:1.

The substantial liquification of the first particulate PASK or PASDK resin contained in the first slurry can be accomplished by using any suitable liquification process known by those skilled in the art. One example of such a suitable liquification process is heating the slurry to a temperature at which the first particulate resin liquifies. Since the liquid component of the slurry containing the resin comprises a polar organic compound (which can also function as at least a partial solvent for the resin), the elevated temperature of the aforementioned resin liquification step will generally not exceed the indicated melting point of the first particulate resin. For example, if the solid component of the first slurry comprises as the first particulate resin, PPSK, and the liquid component of the same slurry consists essentially of the polar organic compound NMP, in order to substantially liquify this specific resin, this slurry must be heated to a temperature of at least about 280° C. (536° F.) although PPSK has a melting temperature of about 340° C.

Another example of a suitable liquification process is the addition of a suitable compound which can function as a solvent of the first particulate resin. Depending upon the type and/or amount of this compound being subsequently added to the first slurry, it may still be necessary to elevate the temperature thereof in order to substantially liquify the particulate resin contained therein. Moreover, if other components are present in the first slurry, the temperature needed to substantially liquify a PASK or PASDK resin contained therein generally increases. For example, if the solid component of the first slurry comprises as the first particulate resin PPSK, and the liquid component of the same slurry consists essentially of the polar organic compound, NMP, and a small amount of water (e.g., approximately 10% by weight of liquid component), in order to substantially liquify this specific resin, this slurry must be heated to a temperature of at least about 300° C. (572° F.).

PASK and PASDK resins generally have a polymerization reaction temperature ranging from about 232° C. (450° F.) to about 288° C. (550° F.). At the termination of typical PASK or PASDK polymerization reactions, a heated first slurry is generally formed in an enclosed vessel. This heated first slurry comprises a particulate PASK or PASDK resin as the solid component and a mixture consisting predominantly of a polar organic compound and water as the liquid component. At the termination of the polymerization reaction, the pressure within the enclosed vessel will generally range from about 150 psig to about 500 psig.

When practicing this invention, the enclosed vessel containing the heated first slurry is vented whereby at least a portion of the water is removed therefrom prior to substantially liquifying the particulate PASK resin contained therein. If the heated first slurry is that which resulted from a polymerization reaction, the presently preferred method of substantially liquifying the particulate PASK resin contained therein is, after venting the vapors from the vessel, heating this vented slurry to a temperature of at least about 280° C. (536° F.); more preferably, in the range from about 280° C. (536° F.) to about 325° C. (617° F.); and even more preferably, from about 290° C. (554° F.) to about 300° C. (572° F.). The temperature employed to substantially liquify a PASDK resin will be somewhat higher. For example, if the heated first slurry is that which resulted from a completed polymerization reaction (i.e., thus containing as part of the liquid component a small amount of water), the presently preferred method of substantially liquifying the particulate PASDK resin contained therein is, after venting the vapors from the vessel, heating this slurry to a temperature of at least about 323° C. (613° F.).

According to this invention, prior to venting vapors from the enclosed vessel, the temperature of the contents therein must be at least about 100° C. (212° F.), preferably at least about 200° C. (392° F.). Although a similar process which does not employ a venting step results in a novel second particulate resin having associated therewith improved processability, the inventive process disclosed herein, which incorporates as a part thereof a venting step prior to substantial liquification, ultimately results in a novel second particulate resin having associated therewith an improved thermal stability and processability and such improvements are achieved without generating pressures that are significantly greater than those generated during the polymerization of the resin.

In accordance with this invention, in order to provide a PASK or PASDK resin having a bulk density greater than about 10 lbs/ft$^3$, a separation agent must be present with the substantially liquified resin and the polar organic compound immediately prior to solidifying the substantially liquified resin in an amount sufficient to result in a second particulate resin having a bulk density greater than about 10 lbs/ft$^3$. Generally, the amount of separation agent necessary to result in a second particulate resin having such a bulk density varies depending on the amount and type of resin and amount and type of polar organic compound present, as well as the amount of water present. As the amount of separation agent present in this mixture prior to solidification increases, the particle size of the resulting second particulate resin generally also increases. Since the particle size of PASK and PASDK resins is directly related to the respective resin's bulk density, as the particle size of these resins increases, generally their bulk density increases.

The amount of separation agent present in the liquid mixture immediately prior to solidification of the substantially liquified resin, includes (1) any water (a separation agent) present in the first slurry at the termination of a polymerization reaction and (2) the separation agent subsequently added to the first slurry, less (3) the water (a separation agent) vented from the vessel.

When present in a mixture comprising a substantially liquified PASK or PASDK resin and a polar organic compound, a separation agent will cause a separation between the liquid polymer in a polymer rich phase and the polar organic compound. General characteristics of agents which will effect such a separation are as follows: (a) soluble in the polar organic compound present in the first slurry; (b) a non-solvent for the first particulate PASK or PASDK resin; and (c) able to effectuate a separation in the mixture between the substantially liquified resin in a polymer rich phase and the polar organic compound. Examples of separation agents which have the aforementioned characteristics include, but are not limited to, water (introduced as a liquid and/or steam), paraffinic hydrocarbons (e.g., heptane, octane, and nonane), higher boiling alcohols (e.g., hexanol), higher boiling ethers (e.g., tetraethyleneglycol dimethylether and diphenylether), and the like, and mixtures thereof.

As stated earlier, the PASK and PASDK polymerization reactions often result in a heated first slurry wherein, due to the polymerization recipe, an initial amount of water is present. Generally, during a typical polymerization process for the preparation of PASK or PASDK, wherein the sulfur source is provided by employing a mixture of a base (e.g., NaOH) and sodium hydrosulfide, approximately 1 mole of water is produced for each mole of divalent sulfur present in the repeating units of the respective resins.

The moles of divalent sulfur present in a PASK or PASDK resin can be readily determined by one skilled in the art. For example, if the first slurry, which contains the first particulate resin, is the slurry resulting from the completion of a typical polymerization reaction, the moles of divalent sulfur present in the resin are approximately equal to the moles of sulfur charged to the polymerization vessel.

After the first particulate resin has been substantially liquified and a sufficient amount of the separation agent has been added, the temperature of the mixture comprising the substantially liquified resin is lowered to a temperature which is at or below the specific resin's liquid-to-solid phase transition temperature. This temperature reduction results in the formation of a second slurry, wherein the liquid component thereof comprises the polar organic compound and the separation agent, and wherein the solid component thereof comprises the novel second particulate resin.

The phrase "liquid-to-solid phase transitional temperature", as used herein, refers to the temperature at which the mixture comprising a substantially liquified resin and a polar organic compound must be lowered in order to solidify the substantially liquified resin contained therein.

While the liquid-to-solid phase transitional temperature differs with the type of resin produced, it can be readily determined by one skilled in the art. For example, by using a high pressure, flat glass gage that can be heated, such as that available from the Jerguson Gage & Valve Co., it can be seen that PPSK when in the presence of the organic amide, NMP, has a liquid-to-solid phase transitional temperature of about 245° C. (473° F.). Therefore, in order to solidify a substantially liquified PPSK resin under these conditions, the temperature of the mixture must be lowered to a temperature at or below 245° C. (473° F.).

On the other hand, PASDK resins have liquid-to-solid phase transitional temperatures which are generally greater than those observed for PASK resins. For example, PPSDK when in the presence of the organic amide, NMP, has a liquid-to-solid phase transitional temperature of about 302° C. (575° F.). Therefore, in order to solidify a substantially liquified PPSDK resin under these conditions, the temperature of the mixture must be lowered to at or below 302° C. (575° F.).

After the second particulate resin has been formed, it can, thereafter, be recovered from the second slurry by employing any suitable recovery means known by those skilled in the art (e.g., filtration). By practicing this invention, the bulk density of the recovered second particulate resin is greater than that of its respective first particulate resin.

The thermal stability of the resulting novel particulate resin can be improved if desired by subjecting the novel particulate resin to a caustic treating process. This subsequent washing process is conducted at an elevated temperature with a suitable base such as an alkali metal carbonate or an alkali metal hydroxide. Alkali metal hydroxides are the presently preferred bases and include, but are not limited to, sodium hydroxide, lithium hydroxide, potassium hydroxide, rubidium hydroxide and cesium hydroxide. The most preferred alkali metal hydroxide, due to its effectiveness and commercial availability, is sodium hydroxide. Generally, the temperature at which the novel second particulate resin can be treated with the suitable base ranges from about 150° C. (302° F.) to about 250° C. (482° F.), preferably, from about 175° C. (347° F.) to about 225° C. (437° F.).

Another means of improving the thermal stability of the resulting particulate resin is by washing the novel particulate resin at an elevated temperature with water-soluble calcium cations. It is preferred that the calcium cations be employed as a salt such as a calcium halide or a calcium carboxylate. Preferably suitable calcium salts include, but are not limited to, calcium chloride, calcium fluoride, calcium bromide, calcium iodide, calcium acetate, and the like, and mixtures of any two or more thereof. The most preferred calcium salts, due to their effectiveness and commercial availability, are calcium chloride and calcium acetate.

Generally, the temperature at which the novel second particulate resin can be treated with the suitable calcium cation ranges from about 150° C. (302° F.) to about 250° C. (482° F.), preferably from about 175° C. (347° F.) to about 225° C. (437° F.).

The process of subsequently washing the novel particulate resin with either a base or the calcium cations or both can be carried out with conventional equipment. A convenient method for carrying out a subsequent treating procedure is to first recover the novel second particulate resin. The recovered second particulate resin is then contacted with the base and/or the calcium cations, in any sequence, in a vessel having provided therein a means of agitation. The contacting can be carried out in a single vessel or with a plurality of vessels.

EXAMPLES

The examples which follow are intended to assist in a further understanding of this invention. Particular materials employed, species, and conditions are intended to be illustrative of the invention and not meant to limit the reasonable scope thereof.

Example I

This example demonstrates a process for preparing a novel particulate PASK resin from a first particulate PASK resin, by one of the processes of this invention. The specific first particulate PASK resin used in this example is poly(phenylene sulfide ketone), henceforth PPSK. The PPSK resin used herein to demonstrate the effectiveness of this invention was prepared in accordance with the following procedure.

To a 2-gallon stirred reaction vessel purged with nitrogen was charged the following reagents which were previously deoxygenated by three pressurize-release cycles using nitrogen: 192 grams of a 58.3 wt. % sodium hydrogen sulfide solution (i.e., 111.4 grams (1.99 gram-moles) of sodium hydrogen sulfide and 80.6 grams (4.4 moles) water), 502 grams (2.0 gram-moles) of 4,4'-dichlorobenzophenone (DCBP), 80 grams (2.0 gram-moles) sodium hydroxide, 108 cc (6.0 gram-moles) water and 2400 cc (24.86 gram-moles) N-methyl-2-pyrrolidone (NMP). The reaction vessel was heated to 250° C. while stirring at approximately 250 rpm. The reaction vessel was maintained at 250° C. for approximately 3 hours. The total amount of divalent sulfur (i.e., as sodium hydrogen sulfide) charged to the reactor, prior to polymerization, was 111.4 grams (1.99 gram-moles); and, the total amount of water charged to the same reactor, prior to polymerization, was 188.6 grams (10.5 moles).

After the 3-hour hold period, the reaction vessel was vented from 180 psig to about 40 psig. During this venting process, approximately 330 cc of liquid overhead was collected.

After the venting process, the reactor was heated to 300° C. while increasing the stirrer speed to about 550 rpm. At this time, 450 cc of water was charged to the reaction vessel. After the water was charged therein, the reaction vessel was permitted to cool to about room temperature.

During the cooling process, a polymerization reaction mixture slurry was formed, wherein the solid component thereof comprised a particulate PPSK resin. This PPSK resin was then recovered from the reaction mixture by filtration. Thereafter, the recovered, particulate PPSK resin was rinsed, forming a first polymeric filter cake containing approximately 50 wt. % resin and approximately 50 wt. % liquid solution. A sample of the first polymeric filter cake was then dried in a forced air oven. This dried sample is hereinafter referred to as Resin 1. The observed data associated with Resin 1 are recorded in Table I.

A second resin (Resin 2) was prepared in accordance with the same procedure set out for Resin 1. The only difference between the preparation of Resin 2 and that of Resin 1 is that for Resin 2, (a) after the 3-hour hold period, the reaction vessel was vented from 190 psig to about 60 psig, during which approximately 202 cc of liquid overhead was collected and (b) after the subsequent heating to 300° C., 500 cc of water was charged into the vessel. The data for Resin 2 are recorded in Table I.

A comparative resin (Resin 3) was prepared in accordance with the same procedure set out for Resin 2. The only difference between the preparation of Resin 3 and that of Resin 2 was that for Resin 3, after polymerization was completed, no venting step was employed. The data for Resin 3 are recorded in Table I.

A second comparative resin (Resin 4) was prepared in accordance with the same procedure set out for Resin 1. The only difference between the preparation of Resin 4 and that of Resin 1 was that for Resin 4, (a) the first slurry was not subsequently heated to substantially liquify the resin and (b) there was no addition of a separation agent to the first slurry after polymerization was terminated. Specifically, at the termination of the polymerization reactor for Resin 4, the temperature of the contents of the reaction vessel was approximately 250° C. The contents of the reaction vessel containing Resin 4 were then cooled until a temperature of about 25° C. was reached. Resin 4 was then recovered from the reaction mixture slurry in accordance with the same procedure set out for Resin 1. The data for Resin 4 are recorded in Table I.

recorded, it is believed that this pressure was less than 130 psig since the reactor pressure during that preparation and prior to the substantial liquification step was lower, and since a lesser amount of the separation agent (water) was added.

Example II

This example demonstrates the effectiveness of increasing the melt stability of a polymer in accordance with the process of this invention.

In this Example the melt flow stability of the two inventive resins from Example I (Resins 1 and 2) were compared with the melt flow stability of a comparative resin (Resin 5).

Resin 5 was prepared using substantially the same procedure as detailed from Resin 1, except that for Resin 5 no venting step was performed. The melt flow values taken at 5 minute intervals for inventive Resins 1 and 2 and for control Resin 5 are recorded in Table II.

TABLE II

| | Effect of Venting on Melt Flow Stability | | | |
|---|---|---|---|---|
| | | Melt Stability[d] | | |
| Resin No. | Venting (250° C.) | 5 min. | 10 min. | 15 min. |
| 1 (Invention) | YES | 147 | 60 | 9 |
| 2 (Invention) | YES | 145 | 64 | 6 |
| 5 (Comparative) | NO | 150 | 53 | 0 |

[d]Melt stability as determined by measuring the polymers' melt flow by ASTM D1238, Method B, Condition 371/5.0, modified to use a five minute preheat time, after 5, 10 and 15 minutes in the melt flow apparatus.

To visually demonstrate the effectiveness of this invention, the data from Table II are plotted on the graph illustrated in FIG. 1. These data demonstrate that the

TABLE I

| | Effects of Venting and the Addition of a Separation Agent | | | | | | | |
|---|---|---|---|---|---|---|---|---|
| | | | Reactor Conditions[b] | | Separation Agent | Reactor Conditions[c] | | Bulk | Type of |
| Resin No. | Water[a] (moles) | Vent (250° C.) | Temp. (°C.) | Press. (psig) | Charged (moles) | Temp. (°C.) | Press. (psig) | Density (lbs/ft³) | Particles Produced |
| 1 | 12.5 | YES | — | 40 | 25 | 300 | — | 20 | granular |
| 2 | 12.5 | YES | — | 60 | 28 | 300 | 130 | — | granular |
| 3 | 12.6 | NO | 250 | 200 | 28 | 300 | 500 | 20 | granular |
| 4 | 12.6 | NO | 250 | 200 | NONE | — | — | 9.9 | powder |

[a]Moles of water present in the first slurry at the completion of the polymerization reaction prior to the addition of any additional separation agent are the sum of (1) the moles of water initially charged into the reactor prior to polymerization and (2) the moles of water produced during polymerization.
[b]Reactor conditions after venting, or, if no venting, after completion of polymerization.
[c]Reactor conditions after (1) liquification of the resin and (2) the addition of the liquid-phase separating agent.

The data of Table I demonstrate that, without the addition of any separation agent (see Resin 4), the amount of water present in the first slurry was less than the amount necessary to result in a granular particle having a bulk density greater than about 10 lbs/ft³. When, on the other hand, 25 moles of water (a separation agent) were added to the mixture containing the substantially liquified polymeric resin, the resulting polymeric resin was in a granular form and had a bulk density of about 20 lbs/ft³, (see Resin 1).

When comparing the data from Resin 2 with that of Resin 3, the data demonstrate that, while the addition of a separation agent to the mixture results in a granular resin having a bulk density of 20 lbs/ft³, if venting is not performed, the reactor pressure after the addition of the separation agent is significantly greater than that observed if venting was performed. Although during the preparation of Resin 1 the final reactor pressure was not melt flow values associated with Inventive Resins 1 and 2 decreased at a significantly slower rate than those associated with Control Resin 5. Therefore, the thermal stability of Inventive Resins 1 and 2 are superior to that of Control Resin 5.

It is evident from the following that various modifications can be made to the embodiments of this invention without departing from the spirit and scope thereof, which will be apparent to those skilled in the art. Having thus described the invention, it is claimed as follows.

That which is claimed is:

1. A process to prepare a high bulk density particulate polymeric resin, having improved processability, comprising the steps of:
   (a) preparing a heated first slurry comprising a solid component and a liquid component in an enclosed vessel, wherein the solid component of said first slurry comprises a first particulate polymeric resin selected from the group consisting of poly(arylene sulfide ketone)s and poly(arylene sulfide diketone)s, and wherein the liquid component of said first slurry comprises a polar organic compound and water;

(b) venting vapors from said enclosed vessel containing said heated first slurry, thereby removing at least a portion of said water;

(c) substantially liquifying said first particulate resin contained in said first heated slurry to form a first mixture comprising said substantially liquified resin and said polar organic compound;

(d) adding, to said first mixture, a sufficient amount of at least one separation agent, to produce a second mixture; and (e) reducing the temperature of said second mixture sufficiently to solidify said substantially liquified resin and form a second slurry comprising a solid component and a liquid component, wherein the solid component of said second slurry comprises a second particulate resin, wherein the bulk density of said second particulate resin is greater than said bulk density of said first particulate resin and wherein the amount of said liquid phase separation agent added to said first mixture, during step (d), is sufficient to result in said second particulate resin having a bulk density greater than about 10 lbs/ft$^3$;

(f) recovering said second particulate resin from said second slurry; and (g) treating said recovered second particulate resin at an elevated temperature with a caustic treating solution.

2. A process in accordance with claim 1 wherein said first particulate resin comprises a poly(arylene sulfide ketone).

3. A process in accordance with claim 2 wherein said substantial liquification of said first particulate resin is accomplished by heating said first slurry to a temperature of at least 280° C.

4. A process in accordance with claim 3 wherein said substantial liquification of said first particulate resin is accomplished by heating said first slurry to a temperature in the range from about 280° C. to about 325° C.

5. A process in accordance with claim 2 wherein said first slurry is prepared by reacting a polyhaloaromatic ketone, an alkali metal sulfide, water, and a polar organic compound under polymerization conditions.

6. A process in accordance with claim 5 wherein said polyhaloaromatic ketone is a dihalobenzophenone; said alkali metal sulfide is sodium sulfide; and said polar organic compound is N-methyl-2-pyrrolidone.

7. A process in accordance with claim 6 wherein said dihaloaromatic ketone is 4,4-dichlorobenzophenone.

8. A process in accordance with claim 2 wherein said poly(arylene sulfide ketone) is poly(phenylene sulfide ketone).

9. A process in accordance with claim 1 wherein said first particulate resin comprises a poly(arylene sulfide diketone).

10. A process in accordance with claim 9 wherein said substantial liquification of said first particulate resin is accomplished by heating said first slurry to a temperature of at least 323° C.

11. A process in accordance with claim 10 wherein said substantial liquification of said first particulate resin is accomplished by heating said first slurry to a temperature in the range from about 323° C. to about 371° C.

12. A process in accordance with claim 9 wherein said first slurry is prepared by reacting a polyhaloaromatic diketone, an alkali metal sulfide, water and a polar organic compound under polymerization conditions.

13. A process in accordance with claim 12 wherein said polyhaloaromatic ketone is a bis-chlorobenzoyl benzene; said alkali metal sulfide is sodium sulfide; and said polar organic compound is N-methyl-2-pyrrolidone.

14. A process in accordance with claim 9 wherein said poly(arylene sulfide diketone) is poly(phenylene sulfide diketone).

15. A process in accordance with claim 1 wherein, prior to substantially liquifying said first particulate resin, the temperature of said first slurry is at least about 100° C.

16. A process in accordance with claim 15 wherein prior to substantially liquifying said first particulate resin, the temperature of said first slurry is at least about 200° C.

17. A process in accordance with claim 1 wherein said separation agent is selected from the group consisting of water, paraffinic hydrocarbons, higher boiling alcohols, higher boiling ethers, and mixtures thereof.

18. A process in accordance with claim 17 wherein said separation agent is water.

19. A process in accordance with claim 1 wherein said caustic solution is selected from the group consisting of solutions containing alkali metal carbonates or alkali metal hydroxides.

20. A process in accordance with claim 19 wherein said caustic solution is an alkali metal hydroxide.

21. A process in accordance with claim 20 wherein said alkali metal hydroxide is selected from the group consisting of sodium hydroxide, lithium hydroxide, potassium hydroxide, rubidium hydroxide and cesium hydroxide.

22. A process in accordance with claim 21 wherein said alkali metal hydroxide is sodium hydroxide.

23. A process in accordance with claim 1 wherein said treating of said recovered second particulate resin with said caustic treating solution is conducted at said elevated temperature ranging from about 150° C. to about 225° C.

24. A process in accordance with claim 23 wherein said treating of said recovered second particulate resin with said caustic treating solution is conducted at said elevated temperature ranging from about 175° C. to about 225° C.

25. A process in accordance with claim 1 wherein said recovered second particulate resin is washed after step (g) at an elevated temperature with water-soluble calcium cations.

26. A process in accordance with claim 25 wherein said calcium cations are employed as a calcium salt.

27. A process in accordance with claim 26 wherein said calcium salts are selected from the group consisting of calcium chloride, calcium fluoride, calcium bromide, calcium iodide, calcium acetate, and mixtures thereof.

28. A process in accordance with claim 27 wherein said calcium salts are selected from the group consisting of calcium chloride and calcium acetate.

29. A process in accordance with claim 25 wherein said treating of said recovered second particulate resin with said calcium cation is conducted at said elevated temperature ranging from about 150° C. to about 250° C.

30. A process in accordance with claim 29 wherein said treating of said recovered second particulate resin with said calcium cation is conducted at said elevated temperature ranging from about 175° C. to about 225° C.

* * * * *